US007050909B2

(12) United States Patent
Nichols et al.

(10) Patent No.: US 7,050,909 B2
(45) Date of Patent: May 23, 2006

(54) AUTOMATIC TAXI MANAGER

(75) Inventors: William Mark Nichols, San Diego, CA (US); Randolph Gregory Farmer, Rancho Palos Verdes, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 25 days.

(21) Appl. No.: 10/767,533

(22) Filed: Jan. 29, 2004

(65) Prior Publication Data

US 2005/0171654 A1 Aug. 4, 2005

(51) Int. Cl.
*G06F 19/00* (2006.01)

(52) U.S. Cl. ...................................... 701/301; 348/119

(58) Field of Classification Search .................... 701/2, 701/3, 15, 23, 206, 301, 120; 340/961; 348/118, 348/119; 382/104

See application file for complete search history.

(56) References Cited

U.S. PATENT DOCUMENTS

| | | | | |
|---|---|---|---|---|
| 3,706,969 | A | 12/1972 | Paredes | |
| 5,170,352 | A * | 12/1992 | McTamaney et al. | 701/26 |
| 5,307,419 | A * | 4/1994 | Tsujino et al. | 382/153 |
| 5,581,250 | A * | 12/1996 | Khvilivitzky | 340/961 |
| 5,684,887 | A * | 11/1997 | Lee et al. | 382/107 |
| 5,844,505 | A | 12/1998 | Van Ryzin | |
| 5,999,865 | A | 12/1999 | Bloomquist et al. | |
| 6,018,697 | A | 1/2000 | Morimoto et al. | |
| 6,118,401 | A * | 9/2000 | Tognazzini | 342/29 |
| 6,181,261 | B1 * | 1/2001 | Miles et al. | 340/933 |
| 6,535,814 | B1 | 3/2003 | Huertgen et al. | |
| 6,606,035 | B1 * | 8/2003 | Kapadia et al. | 340/972 |
| 6,664,529 | B1 * | 12/2003 | Pack et al. | 250/208.1 |
| 6,704,621 | B1 * | 3/2004 | Stein et al. | 701/1 |
| 6,856,894 | B1 * | 2/2005 | Bodin et al. | 701/206 |
| 2001/0051850 | A1 | 12/2001 | Wietzke et al. | |
| 2003/0105579 | A1 | 6/2003 | Walter | |
| 2005/0004723 | A1 * | 1/2005 | Duggan et al. | 701/24 |

OTHER PUBLICATIONS

M. Bertozzi et al., "Vision-Based Vehicle Guidance," *IEEE*, Jul. 1997, pp. 49-55.

M. Bertozzi et al., "GOLD: A Parallel Real-Time Stereo Vision System For Generic Obstacle and Lane Detection," *IEEE Transactions on Image Processing*, vol. 7, No. 1, Jan. 1998, pp. 62-81.

M. Bertozzi et al., "Vision-Based Intelligent Vehicles: State of the Art and Perspectives," *Robotics and Autonomous Systems*, vol. 32, 2000, pp. 1-16.

* cited by examiner

*Primary Examiner*—Michael J. Zanelli
(74) *Attorney, Agent, or Firm*—Robert P. Lenart, Esq.; Pietragallo, Bosick & Gordon LLP

(57) ABSTRACT

A method for moving a vehicle to a predetermined location comprises the steps of producing a real time image of a potential taxi route, comparing the real time image with a stored image to determine if the potential taxi route is clear between the location of the vehicle and a predetermined waypoint, and taxiing the vehicle to the waypoint if the potential taxi route is clear. An apparatus that performs the method is also provided.

14 Claims, 3 Drawing Sheets

AUTOMATIC TAXI MANAGER

FIELD OF THE INVENTION

The invention relates to the field of vehicle navigation systems, and in particular to navigation systems for controlling an unmanned air vehicle along a taxi path.

BACKGROUND OF THE INVENTION

Unmanned air vehicles (UAVs) have been used for surveillance and other purposes. When an unmanned air vehicle is stored at an airfield, it is typically positioned away from a runway. To prepare the vehicle for take-off, the vehicle must be taxied to a take-off position. The time required to move the vehicle to the take-off position could be critical to the mission. In addition, after landing, it is desirable to rapidly return the vehicle to a storage position.

There is a need for a system and method for rapidly moving unmanned aircraft from hangers and holding positions to take-off positions, and for returning the aircraft from a landing position to a hangar or holding position.

SUMMARY OF THE INVENTION

This invention provides a method for moving a vehicle to a predetermined location. The method comprises the steps of producing a real time image of a potential taxi route, comparing the real time image with a stored image to determine if the potential taxi route is clear between the location of the vehicle and a predetermined waypoint, and taxiing the vehicle to the waypoint if the potential taxi route is clear.

The step of comparing the real time image with a stored image comprises the steps of removing background features from the real time image, and evaluating image features that are not background features to determine if those features are obstructions.

The real time image can be provided by one or more visual, electro-optical, or infrared sensors. Taxiing can be controlled in response to temperature and speed of the vehicle.

In another aspect, the invention encompasses an apparatus for moving a vehicle to a predetermined location. The apparatus comprises a sensor for producing a real time image of a potential taxi route, a processor for comparing the real time image with a stored image to determine if the potential taxi route is clear between the location of the vehicle and a predetermined waypoint, and a vehicle control for taxiing the vehicle to the waypoint if the potential taxi route is clear.

DETAILED DESCRIPTION OF THE INVENTION

The invention provides an automatic system and method for controlling the taxi operation of an autonomous, unmanned air vehicle (UAV). The Automatic Taxi Manager (ATM) is designed to utilize information about the runways, aprons, and tarmac, and to combine that information with real time visual and/or electro-optical (EO) or infrared (IR) inputs to provide a taxi route that avoids obstacles encountered in the route.

Figure 1:
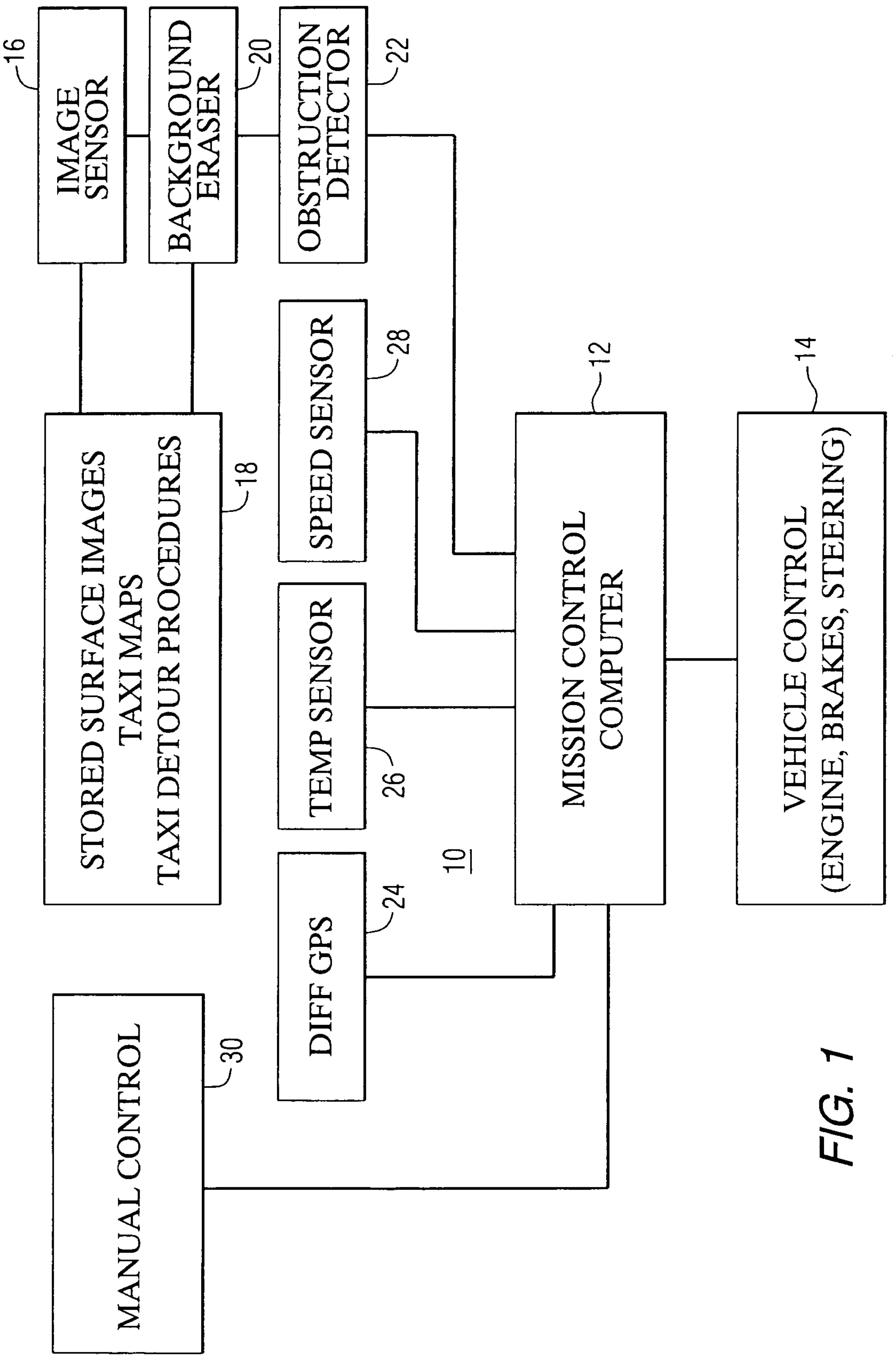
FIG. 1 is a block diagram of a taxi management system constructed in accordance with the invention.

Referring to the drawings, FIG. 1 is a block diagram of a system 10 constructed in accordance with the invention. A mission control computer 12 is used to control various vehicle systems 14, such as the engine, brakes and steering to control movement of the vehicle. An image sensor 16 is used to produce image data of the airfield and objects in the vicinity of the vehicle. A memory device 18 is used to store images of the airfield, taxi maps, and taxi detour procedures. A background eraser 20 is used to remove background information from the image data. An obstruction detector 22 evaluates items of the image data that are not background data to determine if those items are obstructions. Obstruction information is sent to the mission computer for use in determining an appropriate taxi route. The mission control computer also receives input from other sensors, such as a differential global positioning system (DGPS) sensor 24, a temperature sensor 26 and a speed sensor 28. A manual control 30 can be coupled to the mission computer for providing optional manual inputs. The manual control is located off of the autonomous vehicle and can communicate with the components on the vehicle through a communications link. For example, it may be located at a pilot station in a Launch and Recovery Element (LRE) or it may be located in a chase vehicle equipped with a Launch Recovery Override Device (LROD). The LRE is a Ground Control Station that is used primarily during vehicle take-offs and landings. The LROD is a ground vehicle mounted LRE that is used to chase the UAV as it lands or takes off. The purpose is to halt the vehicle if it goes astray. For example, if a manned vehicle gets in the UAV's way, the LRE would be used to swerve the UAV to avoid a collision at speeds higher than taxi speeds. The manual control can also be used to control the operation of the vehicle when the vehicle is learning a new taxi route or when the vehicle must take a detour route.

A taxi detour is an alternate taxi route that branches from a primary route. The vehicle may take the alternate route if it detects an obstruction on the primary route, or if the primary route is damaged. A detour route is used only if the current route is not suitable for passage. The ATM uses the route with the shortest path that is not obstructed from current position to a goal position. The system can automatically detour from a current route to another known route without assistance from a remote pilot if the two routes form a circuit that has only one start and only one end point. However the vehicle will not automatically switch from the middle of one known route to the middle of another if the routes have multiple start points or end points. The reason for this is that the predicted end point is not unique and with multiple start points there may be another UAV in the route from another start point. A remote pilot can maneuver the vehicle from the middle of a known route where an obstacle was encountered to the middle of another known route where the vehicle can then maneuver on its own.

During taxi, current image data is compared with stored image data. To initially obtain the stored images, the vehicle would be operated by a pilot using the manual control. As the vehicle travels along a taxi route, images are acquired using an image sensor. The image sensor can be, for example, a forward looking taxi video camera mounted on the air vehicle. The image frames would be georectified and then mosaiced into a 2-dimensional (2D) map image. The map image is stored in the storage means 18. The 2D map image can be stored as a GeoTIFF image so that georeference tags can be added.

A taxi route can be entered into the ATM as a series of coordinates. In that case, the remote pilot can control the aircraft as it traverses a route defined by the coordinates. Each stop or turn becomes a waypoint. Waypoints can be entered by a remote pilot in a pilot's control station. The vehicle can learn these waypoints as it senses the pilots steering commands, or it can receive waypoints transmitted from the remote pilot's control station.

Images for multiple taxi routes can be stored in the storage means. One mosaiced image map is stored per taxi route. A heading sensor provides orientation information to the vehicle. The heading sensor can be in the form of an electronic compass based on the Hall Effect or a gyro or laser based inertial navigation unit that provides the heading information. The images would be georeferenced using information from the differential global positioning system (DGPS) position and a heading indicator for each video frame prior to georectification. The georeference process finds pixels in the image that correspond to the position given by the DGPS. The reference image is georectified to form a map made of images where each pixel in the image is placed relative to its neighbor in a fashion that permits looking up that pixel based on the coordinates given by the DGPS.

Images can be tagged with the position of the image sensor based on information provided by the DGPS sensor and heading sensor. This position and orientation information is carried forward into the georectified two-dimensional (2D) map image. Upon recalling the images, the vehicle will know its location via the DGPS and heading sensor. The image sensor will provide a current view of a portion of the taxi route. The 2D map image is then reverse georectified to determine what the view looked like in the past. The system then processes the current image and the reverse georectified image to remove background features.

Two techniques can be used to erase the background. Both techniques depend on image comparison. The first technique subtracts two sequential frames from the image sensor that have been shifted so that they represent the same point of view. These frames are real time frames coming from the video sensor. The resulting image will show black for all static image portions and bright areas for features that are moved in the time interval between the frames.

The second technique subtracts the observed real-time frame from a synthesized frame in the stored 2D map images. A delta frame produced by frame subtraction is then processed for edges via convolution with an edge detecting kernel. The resulting edges are then analyzed to determine if they represent hard structured objects that may damage the vehicle, or if they represent inconsequential features such as snow flakes, leaves or dirt. Both techniques are used for real time for moving object detection and the second technique is used for static obstruction detection. Hard and soft object detection can detect the difference between objects that obstruct the path and objects that do not obstruct the path. For example, a soft object might be a pile of moving leaves or snow, while a hard object might be a more rigid body such as a wooden crate. The difference can be detected by processing the optical flow of the parts of the image that are not background. If the optical flow is like a rigid body, that is, if portions of the image always keep a set orientation with respect to each other, then the object is determined to be hard. However if the image is of a bunch of leaves blowing around, the leaves do not keep a set orientation with respect to each other and the object would be determined to be soft. Thus by observation of how the pieces of the foreground objects flow, the objects can be classified as soft or hard objects.

The image detected by the sensor can be limited to the closest field of view that the sensor can image which encompasses twice the wingspan of the vehicle. Obstructions are only identified after the ATM has determined that it is unsafe to proceed so that a remote pilot may intercede and provide guidance or a detour route. The ATM system only tracks objects if those objects are moving. This is accomplished by taking the difference between two consecutive image frames and then doing a statistical analysis of the edges in the difference image to determine if a moving object is present. Motion detection is only used for objects moving relative to the background, not those moving relative to the vehicle.

If the current image in the video sensor does not match a known scene, or a hard moving object is detected via frame differencing, then the vehicle stops until given a safe to proceed signal from a remote pilot. However, a "safe to proceed" signal is not necessary if the vehicle can switch to another known route. If the vehicle cannot proceed on one of its known taxi routes, the remote pilot overrides the ATM and steers the vehicle in a detour maneuver. During the detour maneuver, the vehicle continues to update its stored 2D map image with the new imagery and positions experienced in the detour maneuver.

In addition to obstruction detection, the system can also use temperature and speed data to make decisions about safe maneuvers. As an example, if the temperature is below freezing then speed is decreased and braking is adjusted to prevent skidding. Speed data can also be used to regulate the turning radius that can be used to change direction. Speed is typically limited to that which can be halted within the field of view of the sensor.

The temperature sensor could also be used to help normalize the thermal gradient observed by an IR sensor. The system can include a look-up table to provide the thermal crossover temperatures of ground equipment normally found at the airport. The thermal crossover temperature is the temperature where an object has the exact temperature as its background and thus has no detectable contrast when observed by a thermal sensor. If ground equipment is in the way and the temperature is at the thermal crossover, it may not be detectable. An IR sensor could alternatively be used in conjunction with another sensor as an adjunct sensor that would help to identify obstructions.

The desired destination is determined by comparing the current vehicle position with a destination position via GPS coordinates. In addition, the heading sensor (either from a Hall Effect or inertial navigation unit) is consulted to make sure the vehicle is pointed in the proper direction.

More than one image sensor may be used. Such sensors could be mounted on both wing tips, the nose and/or the tail of the vehicle, and the sensors could be provided with the ability to steer into the turn. Information from other wavelengths can be used in place of, or in addition to, visible images. A modification to the control logic would be the only change needed to accommodate information from other wavelengths.

Unmanned air vehicles that are used for surveillance purposes can include IR sensors and/or electro-optical sensors that are used for surveillance missions. If the IR sensor or electro-optical sensor that is used for surveillance missions is dual purposed for taxi, then a new set of lenses may be needed to provide a much closer focal point, and a mechanism may be needed to swivel the sensor forward. If the IR sensor is a dedicated taxi sensor, then only control logic changes would be required to substitute the IR sensor for an optical image sensor. A video sensor is an EO sensor, so no changes would be required to substitute an EO sensor for an optical sensor.

Figure 2:
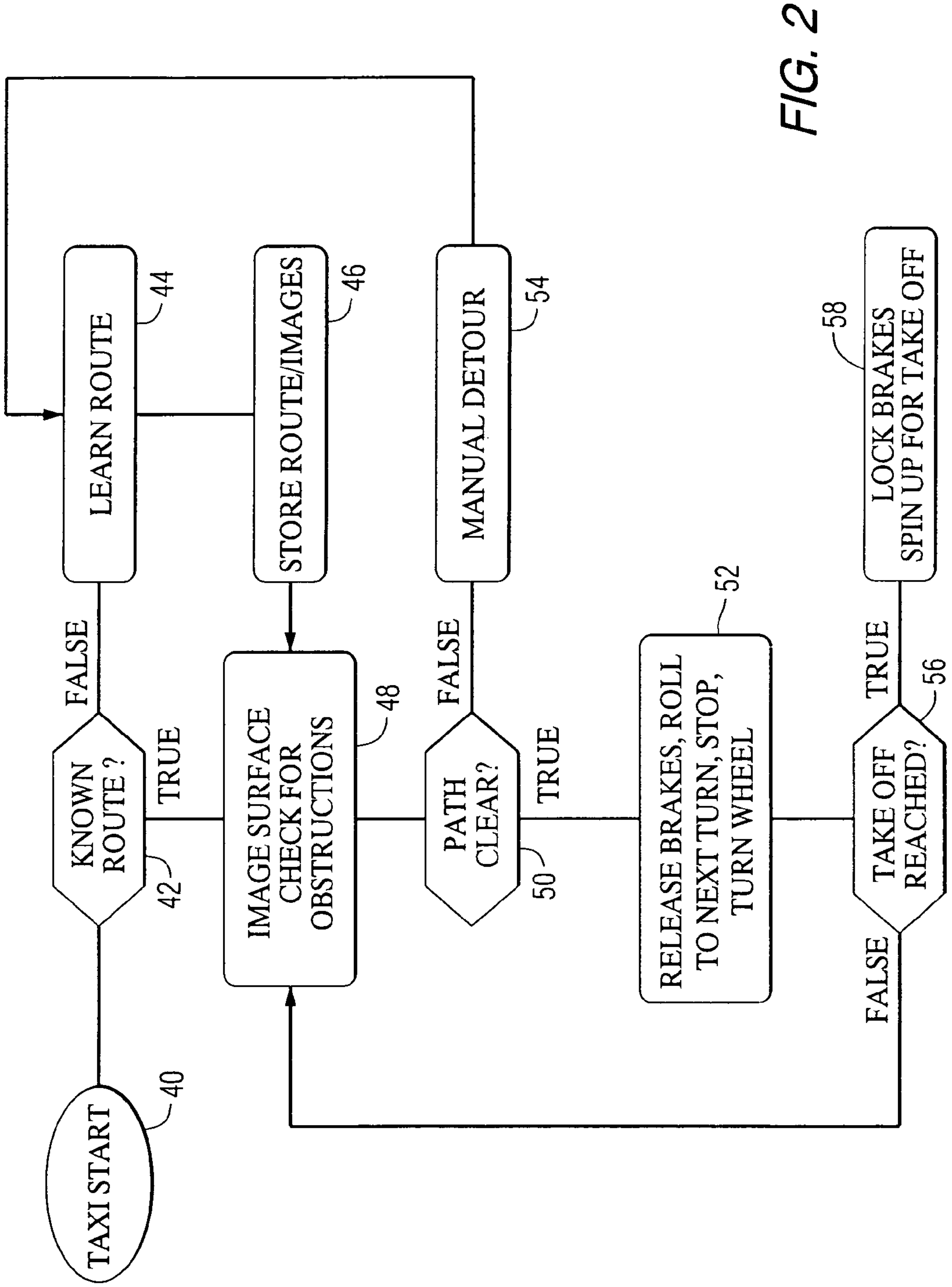
FIG. 2 is a process flow diagram illustrating the method of taxiing for take-off.

FIG. 2 is a flow diagram illustrating the method of taxiing for take-off. The method begins with the vehicle in a stored position as illustrated by block 40. Block 42 illustrates an inquiry about a proposed taxi route. If a known route will not be used, then the route must be learned as shown in block 44. To teach the vehicle a new route, a pilot can use remote control to direct the vehicle along the new route. As the vehicle traverses the new route, it will store images of the new route. The new route images will be stored as shown in block 46 for use in subsequent navigation. After the new route is learned, or if a known route is to be used, block 48 shows that stored images of the route are combined with real time images supplied by the image sensor to check for obstructions. Block 50 shows an inquiry about whether the path is clear. If it is clear, the vehicle can be moved to the next decision point as shown in block 52. The decision points can correspond to waypoints along the taxi route. If the path is not clear, a manual detour can be implemented as shown in block 54 and the altered route is used to update the stored route images. If the take-off position has been reached as shown in block 56, the vehicle can be prepared for take-off as shown in block 58. Otherwise, the stored images are again compared with real time images to check for obstacles.

Figure 3:
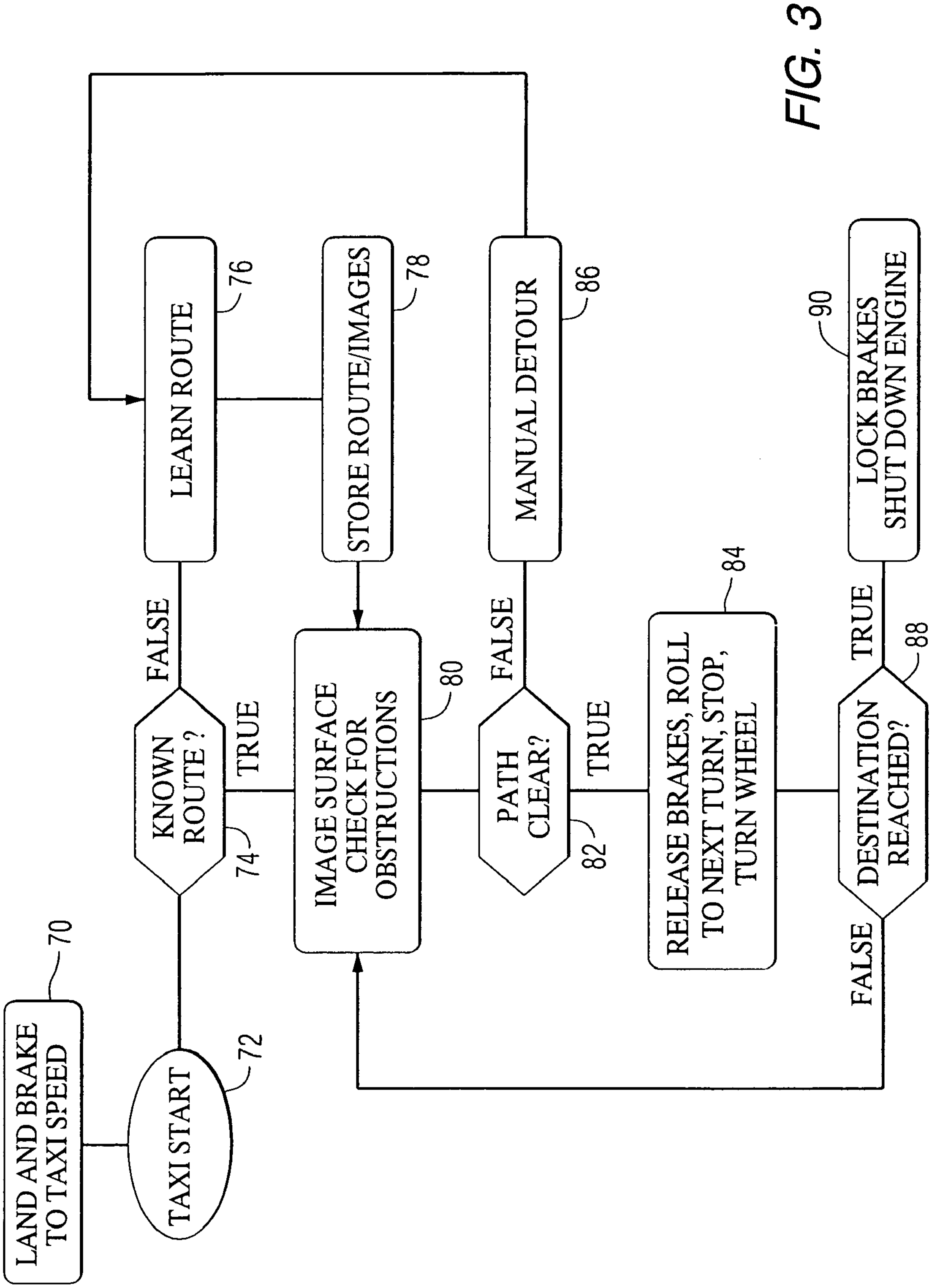
FIG. 3 is a process flow diagram illustrating the method of taxiing after landing.

FIG. 3 is a process flow diagram illustrating the method of taxiing after landing. After the vehicle lands and slows to taxi speed (block 70) the taxi process begins as shown in block 72. Block 74 illustrates an inquiry about a proposed taxi route. If a known route will not be used, then the route must be learned as shown in block 76. When the route is learned, a route image will be stored as shown in block 78 for use in subsequent navigation. After the new route is learned, or if a known route is to be used, block 80 shows that stored images and real time images supplied by the image sensor are processed to check for obstructions. Block 82 shows an inquiry about whether the path is clear. If it is clear, the vehicle can be moved to the next decision point as shown in block 84. If the path is not clear, a manual detour can be implemented as shown in block 86 and the altered route is used to update the stored route images. If the destination position has been reached as shown in block 88, the vehicle can be shut down as shown in block 90. Otherwise, the stored images and real time images are again processed to check for obstacles.

When the UAV lands, it will seek the closest waypoint with the smallest turn required to reach that waypoint. By setting multiple waypoints along the end of the runway the UAV can hook up with the closest point without a turn to enter the taxi route network.

The ATM uses image processing and automatic target recognition techniques to distinguish between valid and clear taxi paths and those paths that are blocked by other vehicles or damaged runways. The system compares current images with stored images to determine if the current path looks like a stored path of the runway areas. If so, then the system determines if the differences between the current path and the known path are due to latent IR shadows, sun/moon shadows, rain, snow, or other benign obstructions, or if the differences are due to damaged or missing tarmac or the presence of a ground vehicle or other hard obstruction.

The ATM provides an automatic means for vehicles to move about an airport and the runways. Background recognition can be used to reveal foreground obstacles and damage to the surfaces the vehicle will travel on. The decision to proceed from waypoint to waypoint, and the speed at which to do so, is based on inputs from an image sensor, temperature sensor, and speed sensor. Precise positions can be provided by a differential GPS. The differential GPS provides exact positions for turn points at the known waypoints.

On the ground, the image sensor is used to gather horizontal views, which are then compared, to an orthorectified image that has known clear paths. If the path is clear, the temperature sensor is consulted to determine a safe speed and the predicted distance to stop. Remote inputs are given to the vehicle to aid in detouring around obstacles or damaged surfaces. Previously used taxi routes, with their matching orthorectified image map, can be shared among vehicles so that only one vehicle need be guided around an obstacle while the others will gain the knowledge of the detour. The system also detects fast moving objects via frame differencing and statistical analysis of the edge patterns remaining after the frame differencing.

The system can automatically generate the orthorectified reference images by over flight and from inputs from a horizontal image sensor. This can be achieved by flying over the airport and taking an image to compare the oblique views with the nadir views, or by creating this nadir view by orthorectification of the oblique views. Images taken during a fly over can be used to teach the ATM new taxi routes (in place of the remote pilot teaching method discussed above). If the UAV knows where it must park after landing, it can use the image to propose a route to the remote pilot. The proposal to the remote pilot is required because some airports have taxi routes parallel to roads. In that case, the remote pilot would ensure that the UAV does use a public road to get to its parking place.

The ATM system may use the whole spectrum of imaging devices including electro-optical, infrared and synthetic aperture radar. The ATM system constantly analyzes the input image to determine whether individual legs of the route are obstructed.

ATM handles situations where obstacles or reference objects are sparse or non-existent, and also detects potholes and static obstructions while having the ability to detect fast moving obstructions. The system builds its own maps based on both sensor inputs and learned routes. An airport can be imaged prior to landing at the airport to achieve a naturally orthorectified reference image. A preloaded map is not required. The system builds its maps as it goes.

The system uses both local and remote memories and shared memories. Remote memories come from the remote pilot. Shared memories can come from other vehicles or fixed sensors. Each UAV has a memory of its experienced routes. Other UAVs can use this information to acquire new routes. Once one UAV has learned how to taxi at an airport, all the other UAVs in its size class can share that knowledge to taxi around the same airport on their first visit. The shared memories work in a distributed fashion. Every UAV remembers its taxi routes for the airports it has taxied around. As a UAV comes to an airport it has not taxied at before, it queries the other UAVs or the Ground Control Station for taxi routes used by other UAVs that have landed at that airport before. Therefore only one UAV must be taught the new taxi route and the other UAVs learn from the first UAV's experience.

Orthorectification and inverse orthorectification are used for comparative analysis. The system can recognize and remove standard airport backgrounds and surfaces. All image objects that are not background are then evaluated for being an obstruction. Temperature, speed and obstruction inputs are fed to the Mission Control Computer to determine if the path is clear. Speed is used to determine if it is safe to turn. The Mission Control Computer commands the engine, brakes, and steering to move air vehicle from turn to turn along the route. If the route is unknown or an obstruction is encountered, teaching inputs may be entered via Manual Control.

While the invention has been described in terms of several embodiments, it will be apparent to those skilled in the art that various changes can be made to the disclosed embodiments without departing from the scope of the invention as set forth in the following claims.

What is claimed is:

1. A method for moving a vehicle to a predetermined location, the method comprising the steps of:

producing a real time image of a potential taxi route;

comparing the real time image with a stored image to determine if the potential taxi route is clear between the location of the vehicle and a predetermined waypoint; and taxiing the vehicle to the waypoint if the potential taxi route is clear, wherein the taxiing step is controlled in response to temperature and speed of the vehicle.

2. The method of claim 1, wherein the step of comparing the real time image with a stored image comprises the steps of:

removing background features from the real time image; and evaluating image features that are not background features to determine if those features are obstructions.

3. The method of claim 2, wherein the step of removing background features comprises the step of:

producing a difference image by subtracting a first image frame from a consecutive image frame.

4. The method of claim 3, further comprising the step of:

analyzing edges in the difference image to determine if a moving object is present.

5. The method of claim 2, wherein the step of removing background features comprises the step of:

producing a difference image by subtracting a first image frame from a stored image frame.

6. The method of claim 5, further comprising the step of:

analyzing edges in the difference image to determine if a moving object is present.

7. The method of claim 1, wherein the stored image is a georectified image, and the method further comprises the step of:

reverse georectifying the stored image prior to the step of comparing the real time image with a stored image.

8. The method of claim 1, wherein the real time image is provided by one or more of: visual, electro-optical, and infrared sensors.

9. An apparatus for moving a vehicle to a predetermined location, the apparatus comprising:

a sensor for producing a real time image of a potential taxi route;

a processor for comparing the real time image with a stored image to determine if the potential taxi route is clear between the location of the vehicle and a predetermined waypoint; and a vehicle control for taxiing the vehicle to the waypoint in response to temperature and speed of the vehicle, if the potential taxi route is clear.

10. The apparatus of claim 9, wherein the processor removes background features from the real time image, and evaluates features that are not background features to determine if those features are obstructions.

11. The apparatus of claim 9, wherein the processor produces a difference image based on two consecutive image frames and then analyzes edges in the difference image to determine if a moving object is present.

12. The apparatus of claim 9, wherein the processor produces a difference image based on a real time image frame and a stored image frame and then analyzes edges in the difference image to determine if a moving object is present.

13. The apparatus of claim 12, wherein the stored image is a georectified image and the processor reverse georectifies the stored image prior to comparing the real time image to the stored image.

14. The apparatus of claim 9, wherein the real time image is provided by one or more of: visual, electro-optical, and infrared sensors.

* * * * *